(12) United States Patent
Burlak et al.

(10) Patent No.: US 7,908,101 B2
(45) Date of Patent: *Mar. 15, 2011

(54) INTEGRATED CIRCUIT AND METHOD FOR MONITORING AND CONTROLLING POWER AND FOR DETECTING OPEN LOAD STATE

(75) Inventors: Gary Joseph Burlak, Lake Orion, MI (US); Marian Mirowski, West Bloomfield, MI (US)

(73) Assignee: STMicroelectronics, Inc., Coppell, TX (US)

( * ) Notice: Subject to any disclaimer, the term of this patent is extended or adjusted under 35 U.S.C. 154(b) by 240 days.

This patent is subject to a terminal disclaimer.

(21) Appl. No.: 12/038,936

(22) Filed: Feb. 28, 2008

(65) Prior Publication Data

US 2008/0204033 A1    Aug. 28, 2008

Related U.S. Application Data

(60) Provisional application No. 60/978,019, filed on Oct. 5, 2007, provisional application No. 60/920,465, filed on Mar. 27, 2007, provisional application No. 60/904,407, filed on Feb. 28, 2007.

(51) Int. Cl.
*G01R 19/00* (2006.01)

(52) U.S. Cl. .............. 702/64; 702/57; 702/79; 702/107; 363/74; 324/504; 323/234; 320/161; 320/162; 318/599

(58) Field of Classification Search .......... 702/58, 702/64, 79, 107; 363/74; 324/504; 323/234; 320/161, 162; 318/599
See application file for complete search history.

(56) References Cited

U.S. PATENT DOCUMENTS

| 4,500,775 | A | * | 2/1985 | Sangu et al. ............ 219/497 |
|---|---|---|---|---|
| 5,030,938 | A | | 7/1991 | Bondzeit |
| 5,157,376 | A | | 10/1992 | Dietz et al. |
| 5,397,924 | A | | 3/1995 | Gee et al. |
| 5,611,695 | A | | 3/1997 | Bentley |
| 5,775,712 | A | | 7/1998 | Link et al. |
| 5,854,517 | A | | 12/1998 | Hines |

(Continued)

FOREIGN PATENT DOCUMENTS

DE    3936638 C1    3/1991

OTHER PUBLICATIONS

NHTSA; "Development, Evaluation, and Demonstration of a Tractor Trailer Intelligent Communication and Power Link—Truck Multiplexing Enclosure Final Report"; DOT HS 808685; Jan. 1998; pp. 1-24.

(Continued)

*Primary Examiner* — Eliseo Ramos Feliciano
*Assistant Examiner* — Elias Desta
(74) *Attorney, Agent, or Firm* — Lisa K. Jorgenson; Andre M. Szuwalski (57) ABSTRACT

An integrated circuit and method for monitoring and controlling power and for identifying an open circuit state at an output port is disclosed. A circuit is implemented to determine whether an open circuit state exists based on a comparison of data received from the output port and attached loads. The data received from the output port and attached loads is compared to a minimum open circuit current value of the output port, wherein the minimum open circuit current value is based on the hardware characteristics of the output port and attached loads. A possible open circuit state at the output port is reported based on the comparison.

27 Claims, 7 Drawing Sheets

U.S. PATENT DOCUMENTS

| | | | |
|---|---|---|---|
| 5,895,989 A * | 4/1999 | Imaizumi et al. | 307/139 |
| 5,920,128 A | 7/1999 | Hines | |
| 5,945,743 A | 8/1999 | Pattantyus et al. | |
| 5,959,365 A | 9/1999 | Mantini et al. | |
| 5,994,790 A | 11/1999 | Nagashima et al. | |
| 6,039,410 A | 3/2000 | Robertson et al. | |
| 6,115,831 A | 9/2000 | Hanf et al. | |
| 6,130,487 A | 10/2000 | Bertalan et al. | |
| 6,259,170 B1 | 7/2001 | Limoge et al. | |
| 6,369,460 B1 | 4/2002 | Endoh et al. | |
| 6,498,403 B1 | 12/2002 | Hagidaira et al. | |
| 6,545,600 B1 | 4/2003 | Boner | |
| 6,630,747 B1 | 10/2003 | Kamada et al. | |
| 6,630,749 B1 | 10/2003 | Takagi et al. | |
| 6,642,628 B2 | 11/2003 | Burdick et al. | |
| 6,700,386 B2 | 3/2004 | Egami | |
| 6,804,098 B2 | 10/2004 | Pannwitz | |
| 7,053,588 B2 | 5/2006 | Nakanishi et al. | |
| 7,173,347 B2 | 2/2007 | Tani et al. | |
| 7,363,127 B2 | 4/2008 | Fogelstrom | |
| 7,429,806 B2 | 9/2008 | Bainbridge | |
| 7,557,540 B2 * | 7/2009 | Kao et al. | 320/132 |
| 7,567,057 B2 | 7/2009 | Elder et al. | |
| 7,598,708 B2 | 10/2009 | Kimura et al. | |
| 7,675,266 B2 | 3/2010 | Nakano et al. | |
| 2001/0040455 A1 | 11/2001 | Arlt et al. | |
| 2002/0030403 A1 | 3/2002 | Lesesky et al. | |
| 2003/0195668 A1 | 10/2003 | Radtke et al. | |
| 2003/0200017 A1 | 10/2003 | Capps et al. | |
| 2004/0119517 A1 | 6/2004 | Pauletti et al. | |
| 2004/0189092 A1 | 9/2004 | Burlak et al. | |
| 2004/0199344 A1 | 10/2004 | Oh | |
| 2005/0253456 A1 | 11/2005 | Spilker | |
| 2006/0125447 A1 | 6/2006 | Sugimoto | |
| 2007/0252439 A1 | 11/2007 | Menas et al. | |
| 2008/0203975 A1 * | 8/2008 | Burlak et al. | 320/161 |

OTHER PUBLICATIONS

James B. Brown; "4th International CAN Conference—Using DeviceNet in the Trailer Industry"; 1997; pp. 1-9.

* cited by examiner

INTEGRATED CIRCUIT AND METHOD FOR MONITORING AND CONTROLLING POWER AND FOR DETECTING OPEN LOAD STATE

CROSS-REFERENCE TO RELATED APPLICATIONS

Pursuant to 35 U.S.C. §119 (e), this application claims priority from, and hereby incorporates by reference for all purposes, U.S. Provisional Patent Application Ser. No. 60/978,019, entitled Smart Trailer Tow Connector, and filed Oct. 5, 2007, and U.S. Provisional Patent Application Ser. No. 60/920,465, entitled Enhanced Dynamic Trailer Detection, Exterior Lighting Classification and Short Circuit Protection Method, Improvement and Enhancement, and filed Mar. 27, 2007, and U.S. Provisional Patent Application Ser. No. 60/904,407, entitled Enhanced Dynamic Trailer Detection, Exterior Lighting Classification and Short Circuit Protection Method, and filed Feb. 28, 2007.

FIELD OF THE INVENTION

The invention relates to electronic circuits, and more particularly the invention relates to an integrated circuit and method for monitoring and controlling power and for detecting an open load state.

BACKGROUND

In vehicles, aircraft, telecommunications and other systems, it is necessary to monitor and control electrical power delivered to various loads. Also, it is desirable to identify an open load state at an output port that is adapted to deliver electrical power to a load. An open load state at an output port may, for example, indicate a malfunction (e.g., a defective LED) or a missing circuit (e.g., a broken connector, wire or load) at the output port. The detected open load condition may represent the absence of a load or may represent a current reduction as measured when a single load or lamp in a multiple load circuit is open.

Production trailer tow designs consist of a mechanical connector with switching and fixed protection devices distributed in one or more modules within the vehicle. In this trailer tow design it is possible for a trailer with a known open load condition to be connected to a tow vehicle without detection of the open load condition. This may lead to hazardous situations where a trailer with non-functioning exterior lights can be pulled by a tow vehicle with no direct detection or indication of the malfunctioning trailer lights. Additionally, partial open detection (e.g., one or more loads open in a multiple load circuit) is also not available. An example would be the marker or running lamp circuit on a travel trailer, which may have eight or more side amber markers (secondary lamps) and two rear marker lamps (primary). The rear marker lamps could be open while the side markers were functioning properly as viewed in the rear view mirror of the tow vehicle. This would not provide a visual indication to the driver that there was a problem, while from the rear the trailer would not be visible to approaching vehicles.

In vehicles designed to tow trailers, a trailer tow connector and electrical components installed in the vehicle to control trailer loads, are typically used to deliver electrical power to the trailer and also to monitor and control various devices or loads installed in the trailer. The trailer tow connector generally includes one or more output ports or pins adapted to deliver electrical power to the trailer devices or loads. The devices may include running lights, brake lights, parking lights, electric brakes, trailer battery and turn signals. Selected output ports or pins in the trailer tow connector are usually connected to a device that serves a particular purpose. For example, there may be an output port for operating the brake lights on the trailer and another output port for operating the right-hand turn signal and yet another for operating the left-hand turn signal.

Existing trailer tow connectors and the electrical components installed in the vehicle to control trailer loads typically lack the capability to perform real time measurement of load currents and to intelligently set open circuit current limits based on the measurements. Simple open detection, as connecting a trailer with a pre-existing open such as a burned out bulb, can not be detected and annunciated to the driver. Furthermore, a vehicle may be used to tow several types and sizes of trailers that have different electrical loads further complicating open load detection in a multiple load circuit, such as trailer marker or running lamps. Existing trailer tow connectors with their supporting electronic switching and fixed protection devices lack the capability to set open circuit current limits based on the load characteristics and observed conditions. Also, existing trailer tow connectors lack the capability to identify an unbalanced load condition in a symmetric load configuration if a pre-existing open is present prior to the connection of the trailer.

SUMMARY OF THE EMBODIMENTS

An integrated circuit and method for monitoring and controlling power and for identifying an open circuit state at an output port is disclosed. The method includes determining a minimum open circuit current value of the output port. The minimum open circuit current value is based on the hardware characteristic of the output port and attached loads. The minimum open circuit current value is stored in a memory.

The method includes measuring the steady state current at the output port for a selected number of times at selected time intervals. The measured steady state current values are stored in the memory. The method includes selecting a subset of the steady state current values. The selection of the subset of steady state current values is performed by a processor. The method includes learning an open circuit current limit value based on the detection of one or more attached loads. The method includes comparing the average current value to the minimum open circuit current value (if no loads detected) or to the learned open circuit current value (if a load or trailer is detected), and reporting a possible open circuit state at the output port. The open circuit state at the output port is validated by a counter that is incremented for successive possible open circuit state. A valid open circuit state is reported if the count value in the counter exceeds a maximum threshold value.

BRIEF DESCRIPTION OF THE DRAWINGS

For a more complete understanding of the features, example embodiments and possible advantages of the present invention, reference is now made to the detailed description of the invention along with the accompanying figures and in which.

DETAILED DESCRIPTION OF THE DRAWINGS

This application incorporates by reference for all purposes, commonly assigned and co-pending U.S. patent application Ser. No. 10/967,389 (Publication No. 2006/0085099 A1) entitled "Method and System for Driving a Vehicle Trailer Tow Connector" which was filed Oct. 18, 2004. This application also incorporates by reference for all purposes United States Applicant for patent Ser. No. 12/039,015 entitled "INTEGRATED CIRCUIT AND METHOD FOR PRESERVING VEHICLE'S BATTERY CHARGE AND PROTECTING TRAILER LOAD") and Ser. No. 12/039,065 entitled "INTEGRATED CIRCUIT AND METHOD FOR CLASSIFICATION OF ELECTRICAL DEVICES AND SHORT CIRCUIT PROTECTION") both filed on Feb. 28, 2008.

Figure 1A:
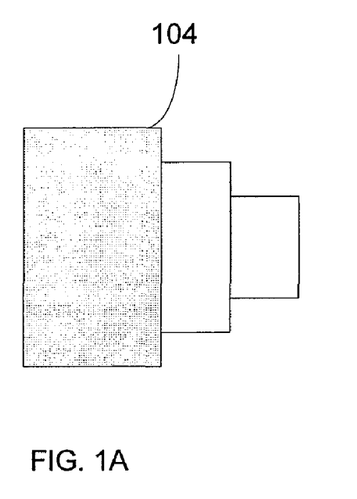
FIG. 1A is a simplified diagram of a trailer tow connector.
Figure 1B:
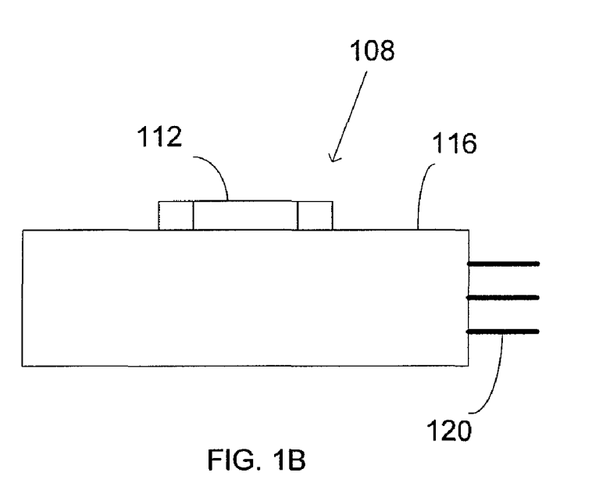
FIG. 1B is a block diagram of an electronic circuit installed inside the trailer tow connector.

FIG. 1A a simplified diagram of a trailer tow connector 104 that may be installed in a vehicle designed to tow a trailer. The trailer tow connector 104 includes an electronic circuit 108 shown in FIG. 1B. Although the electronic circuit 108 is shown separately, it will be understood that the electronic circuit 108 typically resides inside (for example, encapsulated or housed within) the trailer tow connector 104. The electronic circuit 108 includes one or more electronic devices 112 operable to deliver power to the devices in the trailer. The electronic circuit 108 may be installed on a PC board 116, which is securely installed inside the trailer tow connector 104. The electronic circuit 108 includes one or more output ports or pins 120 that are each connected to a particular device in the trailer.

Figure 2:
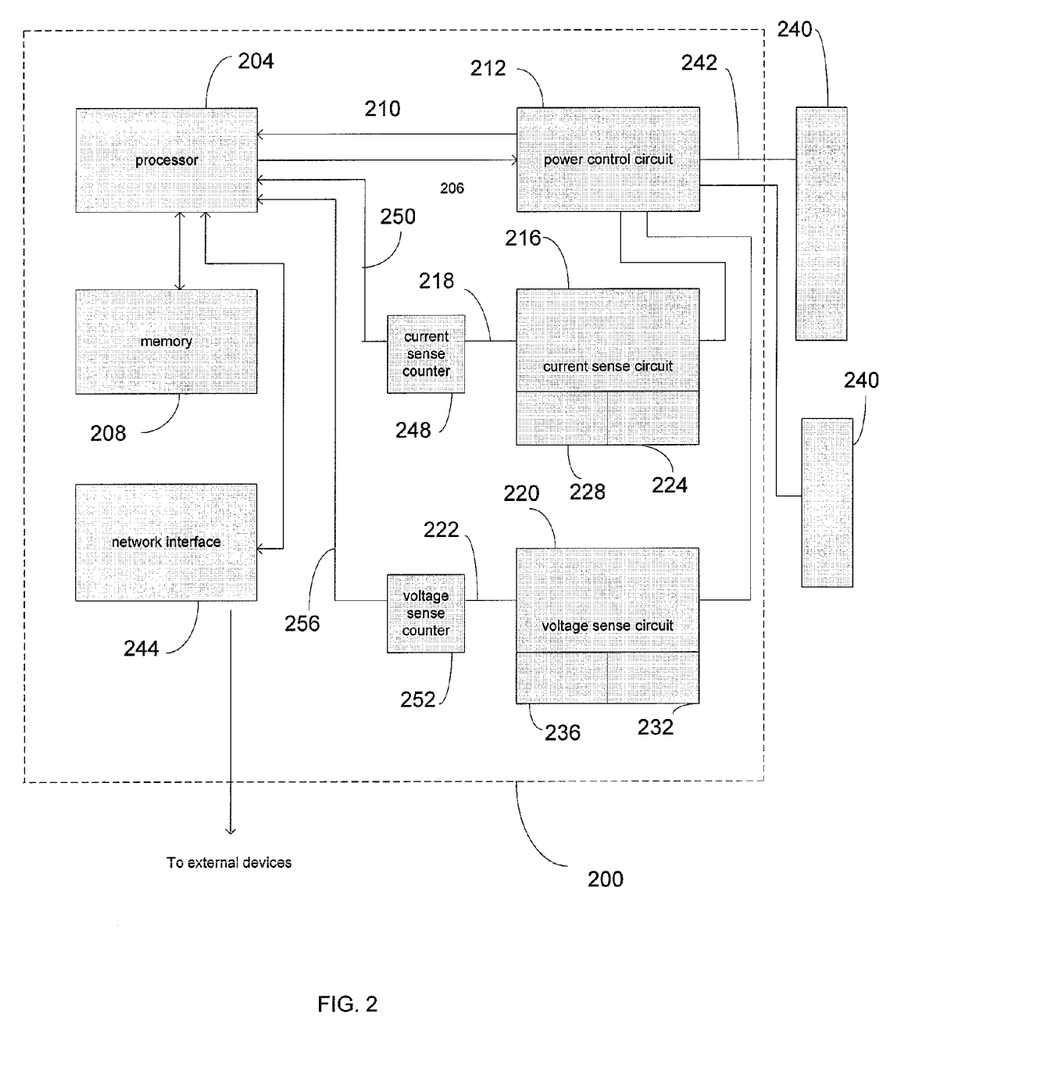
FIG. 2 is an example embodiment of a circuit for monitoring and controlling power and for detecting an open circuit state.

FIG. 2 illustrates an example implementation of a circuit 200 for monitoring and controlling power and for detecting an open load (also referred to as "open circuit") state. The circuit 200 may be implemented as an integrated circuit device fabricated on a semiconductor substrate. Alternatively, the circuit 200 may be implemented with discrete, stand-alone components. The circuit is powered from a power supply (not shown) which may comprise, for example, the battery of a vehicle within which the circuit 200 and connector 104 is installed.

In one example implementation, the circuit 200 may be implemented in a trailer tow connector to monitor and control power in a load and to detect an open load state or open circuit state. The load may be a resistive, an inductive, a capacitive, a battery or any other type of load installed in a trailer that is towed by a vehicle within which the circuit 200 is installed. For example, the load may be a trailer lighting load (LED, incandescent, Xenon, etc.) or a trailer battery. It will be apparent to those skilled in the art that the circuit 200 can be utilized in aircraft power systems, telecommunications, networking, wireless and other applications to monitor and control power in a load and to detect an open load condition within such system applications.

The circuit 200 includes a processor 204 coupled to a memory 208. The processor 204 may be one of several commercially available microcontrollers programmed to execute data processing tasks. In particular, the processor 204 is configured to receive data from, and store data in, the memory 208. The processor 204 performs a plurality of mathematical and/or logical operations on data received from both the memory 208 and from other components of the circuit 200 by executing a plurality of instruction codes.

The circuit 200 includes a switched power control circuit 212 electrically coupled to the processor 200. The switched power control circuit 212 controls the power delivered from the battery to a load 240 in response to a power control signal 206 from the processor 204. The load 240 may be electrically coupled to the switched power control circuit 212 via an output port 242. The switched power control circuit 212 may optionally provide a feedback signal 210 to the processor 204. In one example implementation, the switched power control circuit 212 is a power semiconductor device such as a power MOSFET or a power integrated base transistor capable of delivering controlled power to the load 240. In response to the power control signal 206 from the processor 204, the duty cycle of the power control circuit 212 is varied to regulate the amount of power delivered to the load 240. In one example implementation, the power control signal 206 is a pulse width modulated signal with a varied duty cycle to control the ON and OFF times of the switched power control circuit 212.

The circuit 200 includes a current sense circuit 216 configured to measure the current flowing in the power control circuit 212 and being delivered to each of the loads 240. The current sense circuit 216 may be incorporated into the switched power control circuit 212. Alternatively, the current sense circuit 216 may be a separate, stand-alone circuit configured to measure the current flowing to the load(s) 240. The current sense circuit 216 measures the current flowing to a given load 240 and provides a current sense signal 218 in response to the measured current. As will be subsequently discussed, if the measured current is less than a predetermined current value, the current sense signal 218 may indicate an open circuit state. The predetermined current value may be a minimum current threshold based on the hardware design characteristics of the load 240 and/or the output port 242 of the circuit 200, or the predetermined current value may be based on a learned current value that is calculated during a learning phase as will be subsequently explained. If the measured current is more than a maximum current threshold, the current sense signal 218 may indicate a short circuit condition, prompting the processor 204 to remove power from the load 240.

In one example implementation, the current sense circuit 216 includes a reference current generator 224 that generates a reference current. The current sense circuit 216 also includes a comparator circuit 228 that compares the measured current in the load 240 to the reference current, and responsive to the comparison generates the current sense signal 218. The reference current may be the minimum current threshold, the maximum current threshold, the learned current threshold or any other selected current value. The current sense signal 218 may indicate the operating condition at the output port 242 including any possible malfunction as well as indicate the operating condition of the load 240. More specifically, the current sense signal 218 may indicate the existence of an open circuit state at port 242, a short circuit state at port 242, or that the load 240 is drawing normal current.

In one example implementation, a counter circuit 248 may be used to validate an open circuit condition. This circuit 248 is optionally included, or optionally considered. Signal 218 may be alternatively fed directly to processor 204. Multiple samples of current are taken by circuit 216 with corresponding multiple signals 218 being generated. The counter circuit 248 may be incremented by the signal 218 for each successive detected open circuit condition during the sampling period.

When the count exceeds a maximum threshold, the counter circuit 248 may provide a valid open circuit state signal 250 to the processor 204. The counter circuit 248 will be reset in the absence of the detection of a successive open circuit condition (for example, within the sampling period). Responsive to the valid open circuit state signal 250 from the counter circuit 248, the processor may detect and report an open circuit state condition.

The circuit 200 includes a voltage sense circuit 220 configured to measure the voltage applied by the power control circuit 212 across the load 240. The voltage sense circuit 220 may be incorporated into the switched power control circuit 212. Alternatively, the voltage sense circuit 220 may be a separate, stand-alone circuit configured to measure the voltage across the load 240. The voltage sense circuit 220 measures the voltage across the load 240 and provides a voltage sense signal 222 in response to the measured voltage. If the measured voltage is greater than a predetermined voltage value, the voltage sense signal 222 may indicate an over voltage condition. Also, if the measured voltage is less than a predetermined voltage value, the voltage sense signal 222 may indicate a low battery voltage condition. Responsive to either an over voltage condition, an open condition or a low battery voltage condition, the processor 204 may remove power from the load 240 by adjusting the duty cycle of the power control signal 206 and thus controlling operation of the circuit 212.

In one example implementation, the voltage sense circuit 220 includes a reference voltage generator 232 that generates a reference voltage signal. The voltage sense circuit 220 also includes a voltage comparator circuit 236 that compares the measured voltage across the load 240 to the reference voltage, and responsive to the comparison generates the voltage sense signal 222.

In one example implementation, a counter circuit 252 may be used to validate an over voltage condition, an open condition or a low battery voltage condition. This circuit 252 is optionally included, or optionally considered. Signal 222 may be alternatively fed directly to processor 204. Multiple samples of voltage are taken by circuit 220 with corresponding multiple signals 222 being generated. The counter circuit 252 may be incremented by the signal 222 for each successive detected over voltage condition during the sampling period. When the count exceeds a maximum threshold, the counter circuit 252 may provide a valid over voltage state signal 256 to the processor 204. The counter circuit 252 will be reset in the absence of the detection of a successive over voltage condition (for example, within the sampling period). Responsive to the valid over voltage signal, the processor 204 may detect and report an over voltage condition. A separate counter circuit (not shown in FIG. 2 but similar in configuration and connection to circuit 220) may be used to validate a low battery voltage condition or an open condition.

In one example implementation, the circuit 200 includes a network interface circuit 244 for facilitating communication between the processor 204 and external devices (not shown in FIG. 2). For example, the network interface circuit 244 may facilitate communication between a vehicle (not shown in FIG. 2) and a trailer tow connector incorporating the circuit 200. This interface allows the processor 204 to output communications, such as detections of open load, short circuit or over voltage conditions at the ports 242 and loads 240, to other devices and systems. The interface further allows the processor 204 to receive information, such as programming, command and control information, from other devices and systems.

Figure 3A:
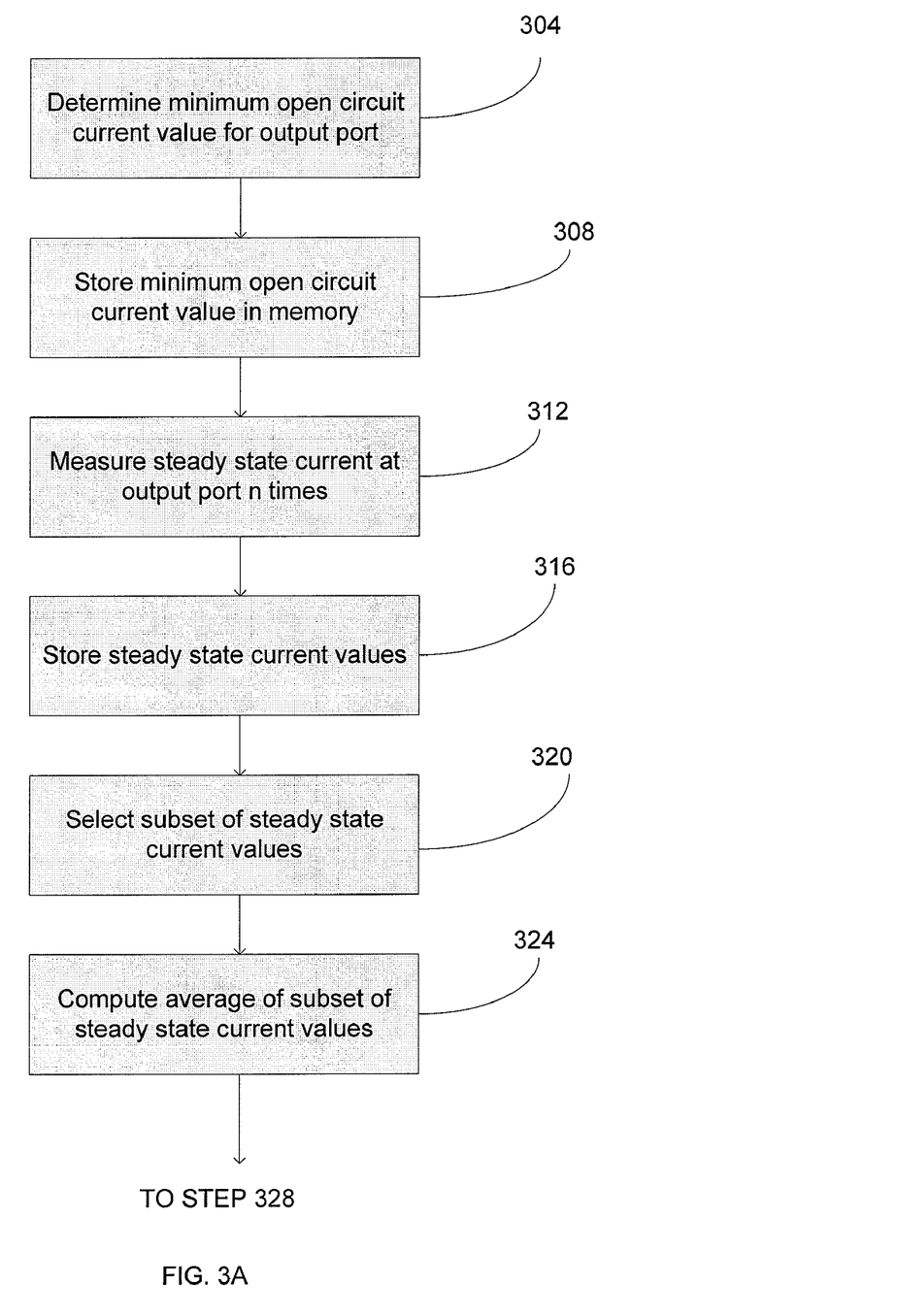
FIGS. 3A-3B are a flow diagram of an exemplary method for identifying an open circuit state at an output port.
Figure 3B:
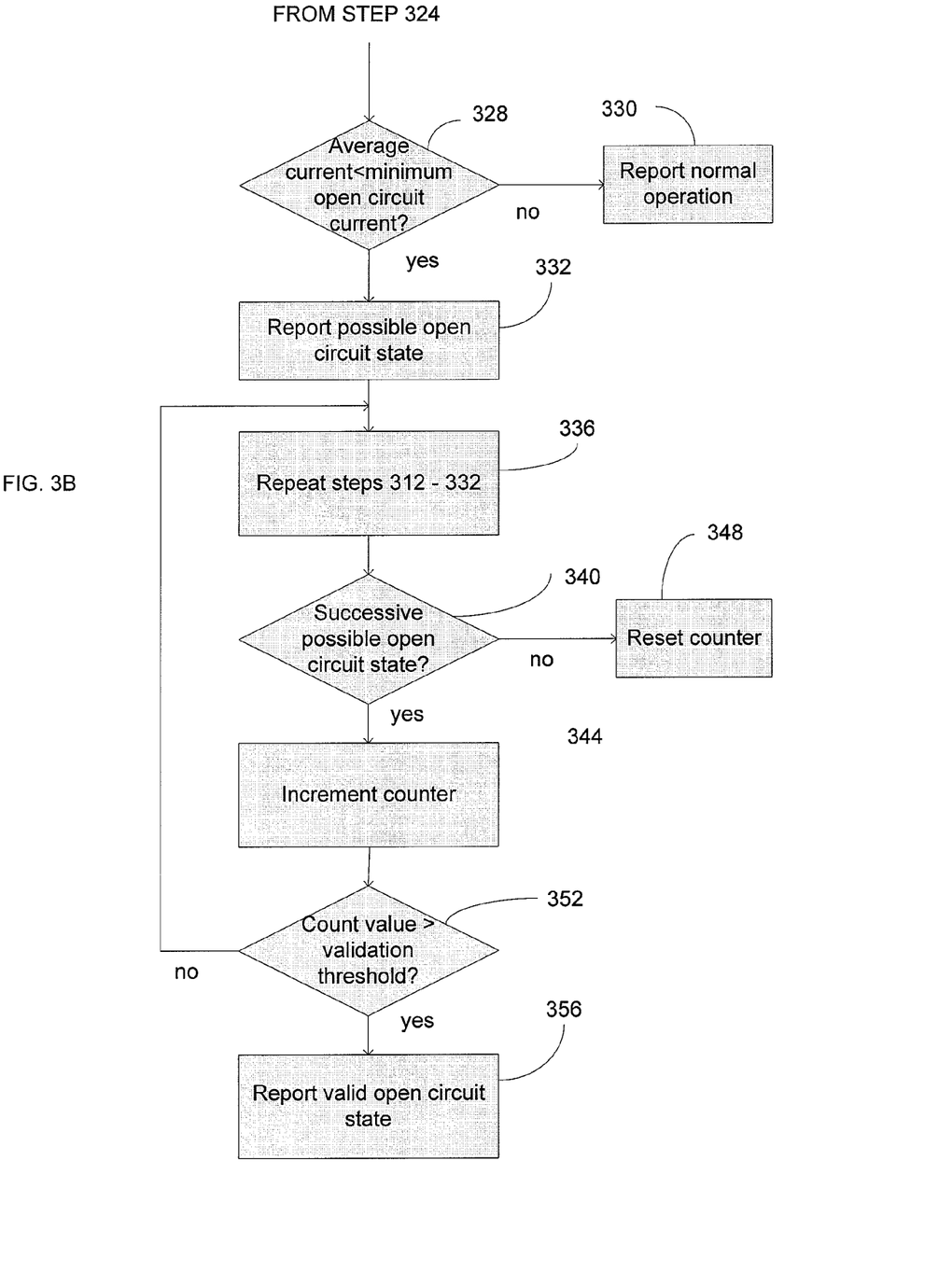

FIGS. 3A-3B are a flow diagram 300 of an exemplary method for identifying an open circuit state at the output port 242 of the circuit 200 shown in FIG. 2. As discussed before, the circuit 200 may be incorporated in a trailer tow connector to regulate electrical power to one or more electrical loads in a trailer and to detect an open load such as an open bulb condition. It will be apparent to those skilled in the art, that the method illustrated in the flow diagram 300 can be utilized to monitor and control power and to detect open circuit condition in aircraft power systems, telecommunications, wireless, networking and other electrical applications.

In step 304, a minimum open circuit current value for the output port 242 is determined. As discussed before, the minimum open circuit current value is based on the hardware characteristics of the output port 242 and/or the characteristics of the load coupled to the output port 242. In one embodiment, the minimum open circuit current value is the absolute minimum threshold based on the hardware characteristics that may be determined during the installation of the circuit 200. This value could be programmed into the circuit through interface 244, or determined by the circuit 200 itself. In step 308, the minimum open circuit current value is stored in a memory such as the memory 208.

In step 312, a load current (real time) flowing out of the output port 242 is measured. In one example implementation, the load current at the output port 242 is measured for n number of times at selected intervals. By way of example, a steady state current may be calculated or derived based on the measurements at a 1 ms interval for a total of 10 sample times. In step 316, the sampled steady state current values are stored in the memory 208.

In step 320, a subset of the stored steady state current values are selected for further analysis. In one example implementation, the processor may select members of the subset by filtering or rejecting all sample current values outside an acceptable range of values. The processor 204 may filter out all sampled transient current values, for example, as caused by an electrostatic discharge or other electrical disturbances. Alternatively, the processor 204 may filter the sampled steady state current values outside a standard deviation of a previously calculated average current value.

In step 324, the processor 204 computes an average value of the subset of the steady state current values. In step 328, the average current value is compared to the minimum open circuit current value. In one implementation, a measured load current (e.g., a raw value) or the steady state current may be substituted for the average load current. As discussed before, the minimum open circuit current value is stored in the memory 208. If the average current value is less than the minimum current value, in step 332 a possible open circuit state is reported. Otherwise, in step 330, a normal operating condition may be reported. A possible open circuit state indicates an open circuit state, and this is indicated in one implementation pending a subsequent validation of the detected open circuit state.

In step 336, the previous steps 312-332 are repeated for a selected number of times. In step 340, a determination is made if there are successive detected open circuit states at the output port 242. If there are successive detected open circuit states at the output port 242, in step 344 a counter (e.g., counter 248) is incremented for each successive detection within a given period of time. Otherwise, in step 348 the counter 248 is reset. In step 352, a determination is made if the count value in the counter exceeds an open circuit validation threshold. If the count value in the counter 248 exceeds the open circuit validation threshold, in step 356 a valid/confirmed open circuit state is reported. Otherwise, the flow returns to step 336. In one implementation, the processor 204 reports a valid/confirmed open circuit state condition via the network interface 244 to an connected external devices or systems.

In response to a valid open circuit state, the processor 204 may take one or more additional actions. For example, the processor 204 may remove power from the output port 242 by adjusting the duty cycle of the switched power control circuit 212 to zero or reduce power by decreasing the duty cycle (through control over signal 206.

The foregoing analysis can be individually made by the processor with respect to each of the included output ports 242. In many applications, it is necessary to detect an open load condition in a multi-load system having multiple ports 242. For example, in a trailer tow application in which multiple lighting loads are powered by a vehicle's switched battery, it is necessary to know if one or more light bulbs are burned out (open) and thus need replacement. Likewise, in communications and other electrical applications, it is desirable to detect open load condition in one or more loads in a multi-load system.

Figure 4A:
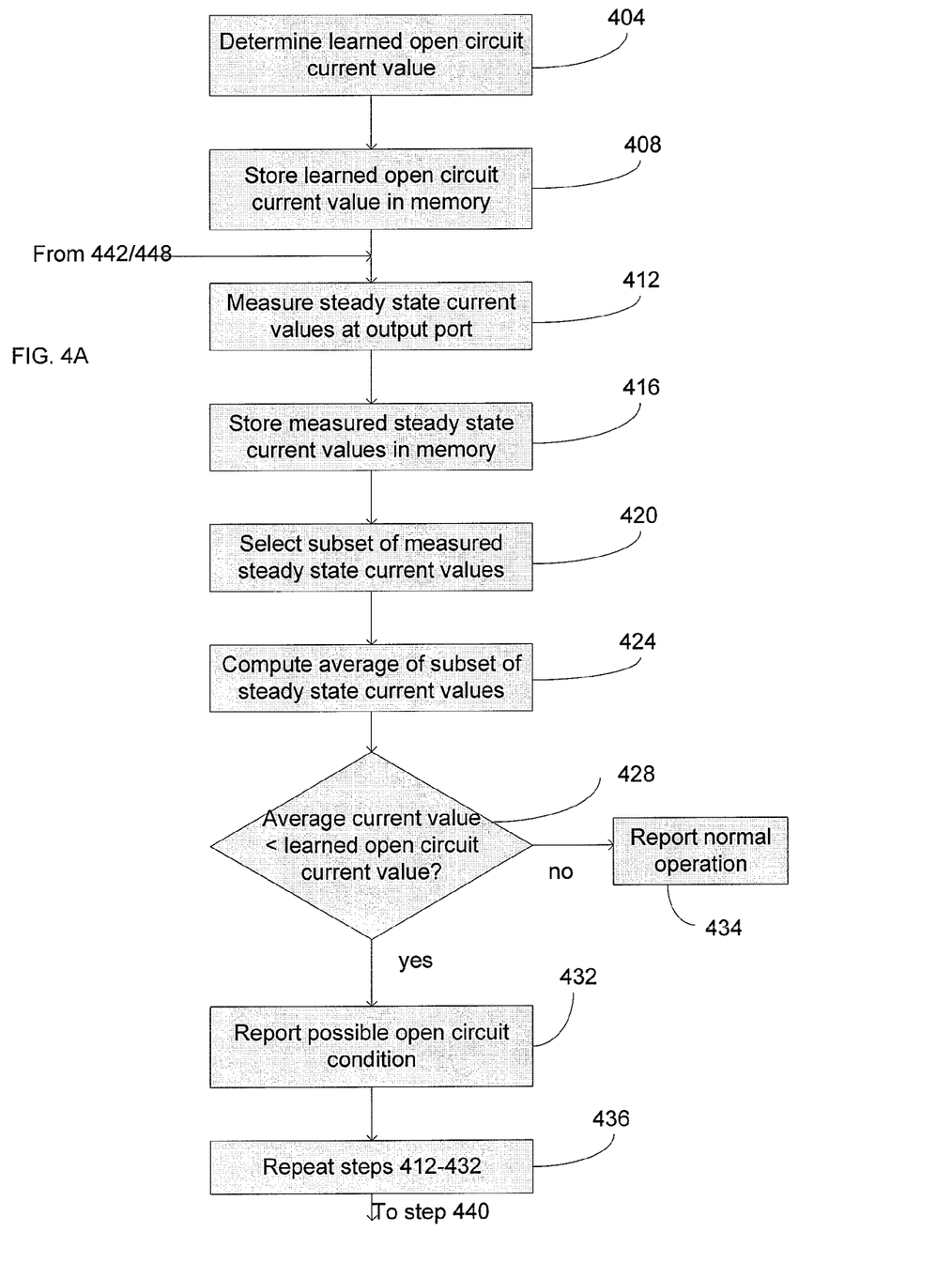
FIGS. 4A-4B are a flow diagram of an exemplary method for identifying an open circuit state at a plurality of output ports each configured to provide electrical power to a respective load.
Figure 4B:
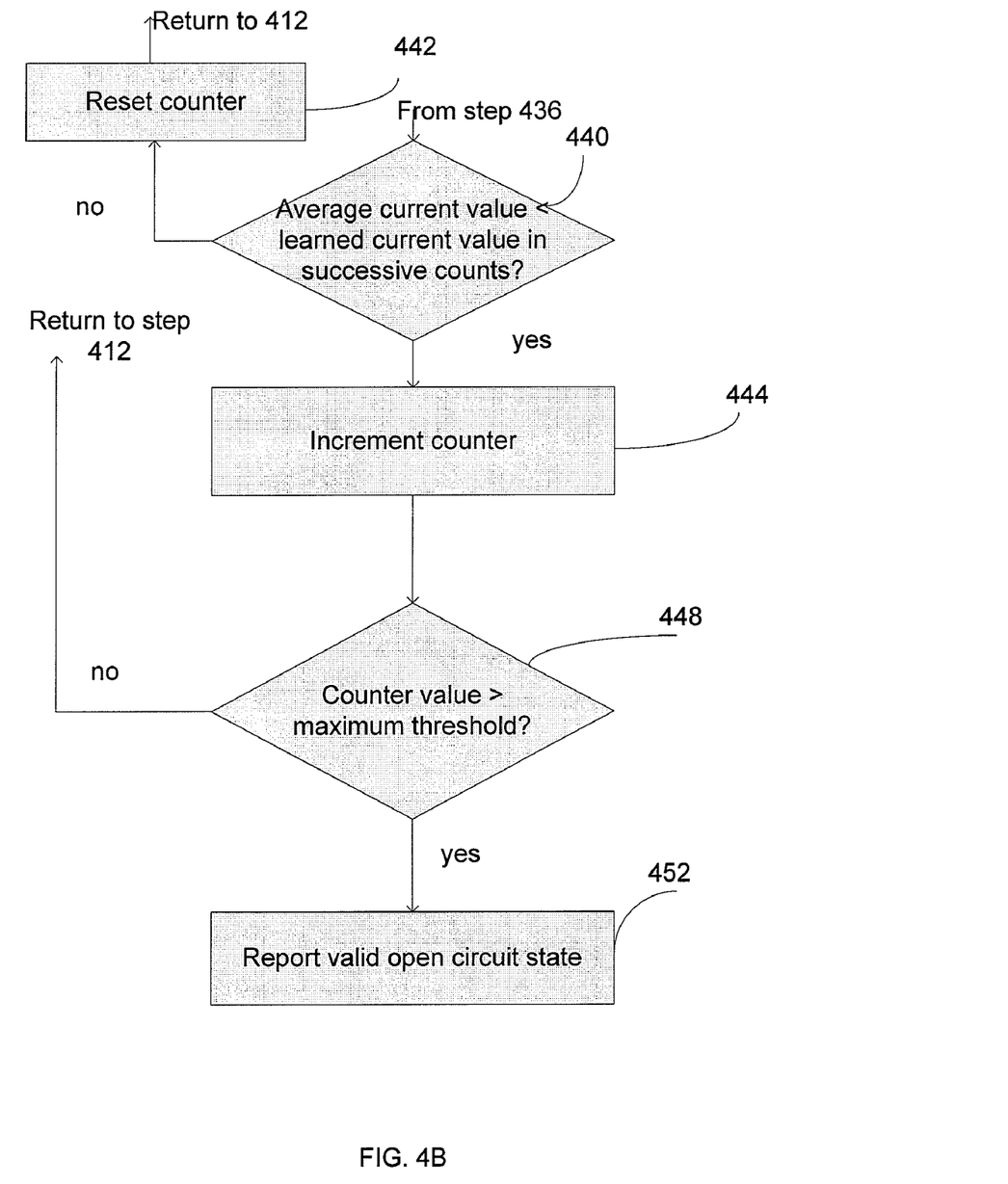

FIGS. 4A-4B are a flow diagram 400 of an exemplary method for identifying one or more open circuit states in an electrical system configured to provide electrical power to multiple loads. In step 404, a learned open circuit current value at the output port is determined. In one implementation, the learned open circuit current value is based on a plurality of measured steady state learn-phase load currents measured or calculated after the connection of one or more load devices has been detected. The process for determining the learned open circuit current value is subsequently discussed.

In step 408, the learned open circuit current value is stored in a memory (e.g., memory 208). In step 412, the steady state current at an output port (e.g., one of the output ports 242) is measured for a selected number of times at selected time intervals. In step 416, the measured steady state current values are stored in the memory 208. In step 420, a subset of the steady state current values are selected by the processor 204. In one example implementation, the processor may select the subset by filtering or rejecting all current values outside an acceptable range of values. The filtering may be based on a fixed or calculated deviation from the calculated average current value (or alternatively from the measured load current value). The processor 204 may filter all transient current values caused by an electrostatic discharge, or other electrical transients that may also be caused by, for example, load dumps, electrical noise, electromagnetic disturbances or vehicle jump starts. Alternatively, the processor 204 may filter the steady state current values outside a standard deviation of a previously calculated average current value.

In step 424, an average current value of the subset of the steady state current values is calculated by the processor 204. In step 428, the average current value is used to calculate the learned open circuit current value which is then compared to the load current value. Based on design requirements the load current value may be the measured load current (a raw value), the steady state current (filtered) or the average load current If the load current value is less than the learned current value, in step 432, a possible open circuit condition is reported. The possible open circuit condition indicates that one of the output ports has an open circuit condition. This indication is determined pending a subsequent validation. For example, an open circuit condition may indicate that one of the lighting loads (e.g., LED, incandescent) in a multiple load trailer circuit is blown and thus needs a replacement.

In step 436, the previous steps 412-432 are repeated for validating the prior open circuit condition determination. In step 440, a determination is made if the load current value is less than the learned current value in successive counts over a certain period of time. If the load current value is less than the learned open circuit current value in successive counts during the period of time, in step 444 a counter (e.g., counter 248) is incremented for each such determination. Otherwise, in step 442, the counter is reset and the flow returns to step 412.

In step 448, a determination is made whether the count value in the counter exceeds a maximum threshold value. If the count value exceeds the maximum threshold value, in step 452, a valid/confirmed open circuit state is reported. Otherwise, the flow returns to step 412. In one example implementation, the processor 204 reports the valid/confirmed open circuit state via the network interface 244.

Figure 5:
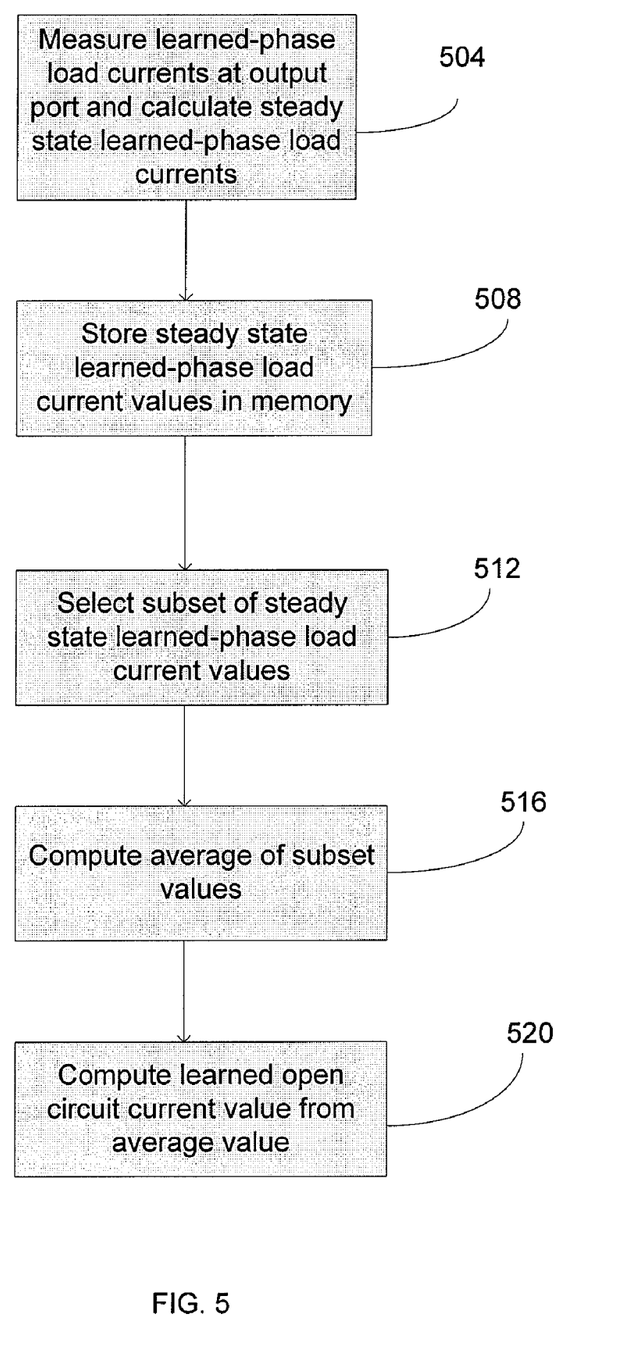
FIG. 5 is a flow diagram of an exemplary method for determining a learned open circuit current.

FIG. 5 is a flow diagram of an exemplary method for determining the learned open circuit current (step 404 of FIG. 4A) by the processor 204. In step 504, the learn-phase load current at the output port is measured for a selected number of times at selected time intervals and a steady state learn-phase load current is calculated or derived.

In one example implementation, the steady state learn phase load currents are measured after a load detection such as when the load is initially connected to the output port. For example, in a trailer tow application, the steady state learn-phase load current may be calculated after the trailer is connected to the vehicle. The learning phase is active whenever a trailer or at least one load has been connected and remains connected. The open limit learn process is thus started and continually recalculates the steady-state learn-phase currents, the average load current and the learned open circuit current value. When there are no loads or when a trailer is not detected, then the learned open circuit value and related values are all cleared and only the minimum open circuit current value is used for open circuit detection. The steady state learn phase load current is used to determine appropriate operating conditions for one or more loads.

In step 508, the calculated steady state learn phase load current values are stored in the memory 208. In step 512, a subset of the steady state learn phase load current values are selected by the processor 204. The subset may be selected by filtering all current values outside a pre-selected range in order to eliminate current spikes caused by electrical transients or noise. In step 516, an average value of the subset of the steady state learn phase current values are determined.

In step 520, the learned open circuit current value is determined from the average of the subset of the steady state learn phase current values. In one implementation, the learned open circuit current value is a selected percentage of the average of the subset of the steady state learn phase current values. For example, the learned open circuit current value may be set at 75% of the average of the subset. The learned open circuit current value is greater than the minimum open circuit current value discussed before.

In one example implementation, the learned open circuit current value is calculated whenever a load is coupled to the output port. The learned open circuit current value is determined by real time measurements of load current, which allows the computation of appropriate open circuit current limit for varying loads.

The above method may be expanded to determine an unbalanced load condition in a symmetric load configuration. A symmetric load is defined as two or more electric circuits (i.e., loads) that are electrically identical or similar, but are divided or split and electrically isolated. Examples of symmetric loads based on design segregations include left-right or front-back electrical circuits and left turn and right turn signals. If a plurality of symmetric loads are each coupled to their respective output port, the method allows the determination of one or more open loads. For example, in a trailer tow application, the method may determine if a symmetric load (e.g., left-side lamp, right-side lamp) is open. The open condition may indicate that a lamp is burned out and needs to be replaced. Consider a scenario in which there are two symmetric loads. The average load currents at the two symmetric output ports are compared. If the percentage difference between the two average load currents exceeds a maximum allowable percentage difference, a possible unbalanced or partial open load condition is reported. For example, the maximum allowable percentage difference may be 15%. In other words, if one of the symmetric loads is drawing 15% less current than the other symmetric load, a possible unbalanced state or open load condition is flagged.

As discussed before, a counter can be used to count the successive possible unbalanced state detections and to report a valid unbalanced state if the count value exceeds a maximum threshold value. In response to a validated unbalanced load report, the processor 204 may remove power from the output port through controlling circuit 212 with signal 206.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. A method for identifying an open circuit state at an output port configured to provide power to an electrical device coupled to the output port, comprising:
    (1) storing a minimum open circuit current value of the output port in a memory device, the minimum open circuit current value being based on a hardware characteristic of the output port;
    (2) measuring a current value at the output port for a selected number of times at selected time intervals;
    (3) storing the measured current values in the memory device;
    (4) selecting a subset of current values;
    (5) calculating an average of the selected subset of the current values;
    (6) comparing the average current value to the minimum open circuit current value; and
    (7) identifying the open circuit state at the output port based on the comparison.

2. The method according to claim 1, further comprising reporting a possible open circuit state at the output port if the average current value is less than the minimum open circuit current value.

3. The method according to claim 1, further comprising:
    repeating (2)-(7) as recited in claim 1 and reporting a possible open circuit state at the output port if the average current value is less than the minimum open circuit current value;
    incrementing a count value for successive possible open circuit states at the output port;
    reporting a validated open circuit state at the output port if the count value exceeds an open circuit validation threshold count; and
    resetting the count value if the average current value exceeds the minimum current value.

4. The method according to claim 3, further comprising removing power from the output port if a validated open circuit state is reported.

5. The method according to claim 1, wherein the subset of the current values are selected by filtering ones of the measured current values outside an acceptable range of current values.

6. The method according to claim 1, wherein the subset of the current values are selected by filtering transient ones of the measured current values.

7. The method according to claim 1, wherein the subset of the current values are selected by filtering the ones of the measured current values outside a standard deviation of a previously calculated average current value.

8. A method for identifying an open circuit state at one of a plurality of output ports each configured to provide power to an electrical device, the method comprising:
    (1) determining a learned open circuit current value of the output port, the learned open circuit current value being based on a plurality of measured learn-phase load currents at the output port;
    (2) storing the learned open circuit current value in a memory device;
    (3) measuring a current value at the output port for a selected number of times at selected time intervals;
    (4) storing the measured current values in the memory device;
    (5) selecting, by a processor, a subset of the current values;
    (6) calculating, by the processor, an average of the selected subset of the current values;
    (7) comparing the average current value to the learned open circuit current value; and (8) identifying the open circuit state based on the comparison.

9. The method according to claim 8, wherein determining the learned open circuit current comprises:
measuring the learn-phase load current at the output port for a selected number of times at selected time intervals;
storing the measured learn-phase load current values in the memory device;
selecting, by the processor, a subset of the learn-phase load current values; and
generating the learned open circuit current from the average of the subset of the learn-phase current values.

10. The method according to claim 8, further comprising repeating (3)-(8) as recited in claim 8 and reporting a possible open circuit state at the output port if the average current value is less than the learned open circuit current value;
incrementing a count value for successive possible open circuit states at the output port;
reporting a validated open circuit state at the output port if the count value exceeds an open circuit validation threshold count, the validated open circuit state indicating an open load condition at the output port; and
resetting the count value if the average current value exceeds the learned open circuit current value.

11. The method according to claim 10, further comprising:
determining if the output port has a symmetrical output port, the symmetrical output port being equivalent to the output port;
determining, by the processor, the average load current at the symmetric output port;
comparing, by the processor, the symmetric output port's average load current to the output port's average load current; and
determining, by the processor, a percentage difference between the average load current at the output port and the average load current at the symmetric output port.

12. The method according to claim 11, further comprising reporting a possible unbalanced load condition if the percentage difference exceeds a maximum percentage.

13. The method according to claim 12, further comprising:
incrementing a count value for successive possible unbalanced load conditions at the output port;
reporting a validated unbalanced load condition at the output port if the count value exceeds an unbalanced load validation threshold count;
resetting the count value if the percentage difference is less than the maximum percentage.

14. The method according to claim 13, further comprising removing power from the output port if a validated unbalanced load condition is reported.

15. An integrated circuit device for monitoring and controlling an output port adapted to provide electrical power to a load, the integrated circuit device identifying an open circuit state at the output port, comprising:
a memory;
a processor electrically coupled to the memory, the processor configured to store data in, and receive data from, the memory;
a switched power control circuit electrically coupled to the load, the switched power control circuit configured to control the electrical power delivered to the load by varying a duty cycle responsive to a power control signal received from the processor;
a current sense circuit electrically coupled and configured to measure current flowing to the load and provide a current sense signal representative of the measured current to the processor, the current sense circuit further configured to provide an open circuit state signal to the processor when the measured current is less than a minimum open circuit current; and
the processor configured to store data representative of the current sense signal in the memory, the processor further configured to provide the power control signal to the switched power control circuit responsive to the current sense signal, the processor further configured to report the open circuit state responsive to the open circuit signal.

16. The integrated circuit device of claim 15, wherein the power control signal is a pulse width modulated signal for controlling the duty cycle of the switched power control circuit.

17. The integrated circuit device of claim 15, further comprising varying, by the processor, the duty cycle of the switched power control circuit to remove power from the output port responsive to the current signal indicating that the measured current flowing through the load exceeds a maximum current.

18. The integrated circuit device of claim 15, further comprising varying, by the processor, the duty cycle of the switched power control circuit to remove power from the output port responsive to the open circuit signal.

19. The integrated circuit device of claim 15, wherein the current sense circuit further comprises:
a reference current circuit configured to provide a reference current;
a first comparator circuit configured to compare the measured current flowing through the load to the reference current, the comparator circuit further configured to provide the current sense signal responsive to the comparison.

20. The integrated circuit device of claim 15, further comprising a voltage sense circuit configured to measure the voltage across the load.

21. The integrated circuit device of claim 15, further comprising a network interface circuit configured to facilitate communication between the processor and external devices.

22. A integrated circuit device for monitoring and controlling a plurality of output ports each adapted to provide electrical power to a respective load, the integrated circuit identifying an open circuit state at one of the output ports, comprising:
a memory;
a processor electrically coupled to the memory, the processor configured to store data in, and receive data from, the memory;
a plurality of switched power control circuits each electrically coupled to a respective load, the switched power control circuit configured to control the electrical power delivered to the load by varying a duty cycle responsive to a power control signal from the processor;
a plurality of current sense circuits each electrically coupled to a respective load, the current sense circuit configured to measure the current flowing through the load and provide a current sense signal representative of the measured current to the processor; and
the processor configured to store data representative of the current sense signal in the memory, the processor further configured to provide the power control signal to the switched power control circuit responsive to the current sense signal, the processor including (a) a learn operating mode which calculates a learned open circuit current value at the output port based on a plurality of current sense signals during a learning stage, and (b) a monitoring mode which calculates an average current value at the output port based on a plurality of current sense signals during a steady state, the processor further configured to report an open circuit state at the output port responsive to a comparison of the average current value to the learned open circuit current value.

23. The integrated circuit device of claim 22, wherein the power control signal is a pulse width modulated signal configured to control the duty cycle of the switched power control circuit.

24. The integrated circuit device of claim 22, wherein the duty cycle of the switched power control circuit is varied by the power control signal from the processor to remove power from the output port.

25. The integrated circuit device of claim 22, wherein the processor reports the open circuit state when the average current value is less than the learned open circuit current value.

26. The integrated circuit device of claim 22, wherein the current sense circuit further comprises:
  a reference current circuit configured to provide a reference current;
  a first comparator circuit configured to compare the measured current flowing through the load to the reference current, the comparator circuit configured to provide the current sense signal responsive to the comparison.

27. The integrated circuit device of claim 22, further comprising a network interface circuit configured to facilitate communication between the processor and external devices.

* * * * *